Sept. 20, 1960 M. J. HELLSTROM 2,953,640

AUTOMATIC GAIN CONTROL

Filed Dec. 14, 1956 3 Sheets-Sheet 1

WITNESSES:

Bernard R. Giegucy

Leon J. Vaga

INVENTOR

Melbourne J. Hellstrom

BY J. J. Callahan

ATTORNEY

Sept. 20, 1960 M. J. HELLSTROM 2,953,640

AUTOMATIC GAIN CONTROL

Filed Dec. 14, 1956 3 Sheets-Sheet 2

Sept. 20, 1960 M. J. HELLSTROM 2,953,640

AUTOMATIC GAIN CONTROL

Filed Dec. 14, 1956 3 Sheets-Sheet 3

United States Patent Office 2,953,640

Patented Sept. 20, 1960

2,953,640

AUTOMATIC GAIN CONTROL

Melbourne J. Hellstrom, Metuchen, N.J., assignor to Westinghouse Electric Corporation, East Pittsburgh, Pa., a corporation of Pennsylvania Filed Dec. 14, 1956, Ser. No. 628,425

3 Claims. (Cl. 178—7.3)

This invention relates to television receiving systems, and more particularly to automatic gain controls for use in such systems.

In order that the gain of a television receiver be in accordance with the proper aspects of the received television carrier, it is desirable that an automatic gain control potential be developed in the receiver such that its magnitude is a function of the received carrier of the television signal during the blanking and synchronizing intervals only and not during the transmission of the video or line information. Thus, in automatic gain control systems for television receivers, the peaks of the composite video signal (the synchronizing signal tips, are used as an indication of signal strength since they are proportional to the received carrier strength and independent of average amplitude variations of the video components of the television signal. In one type of automatic gain control system, the synchronizing signal tips are peak detected and the resultant direct current component or potential is used to control the gain of various receiver stages. If a long time constant is used (greater than the period of one vertical field) in the detector, then the system is relatively insensitive to noise pulses. However, such an arrangement will not compensate for rapid variations in signal strength such as "airplane flutter." The converse is true if a short time constant is used. To overcome these advantages, automatic gain control system of the "gated" or "keyed" variety were developed wherein the incoming signal is sampled only during predetermined time intervals, usually corresponding to the composite signal synchronizing level or blanking level. The sampled signal is then peak detected with a short time constant. Since in the keyed type of automatic gain control system a control potential is developed only in accordance with information sampled from the incoming signal at these predetermined time intervals, the immunity of the control potential to noise bursts is greatly increased; and the keyed type of automatic gain control system can follow rapid fluctuations in signal strength because of the short time constant.

The present invention provides an automatic gain control circuit for a television receiver in which selective sampling is accomplished by adding to the composite video signal in correct phase with the synchronizing signals, a pedestal which exists during horizontal retrace time. The sum of these two signals is peak detected with a short time constant to allow for control of rapid changes in signal strength. A time constant of a few to several horizontal line intervals for example one and five horizontal line intervals has been found satisfactory. A transistor may be used in the automatic gain control circuit of the present invention to provide an automatic gain control potential which will have the desirable characteristics of a conventional keyed automatic gain control circuit. A transistor cannot be utilized in a conventional keyed automatic gain control circuit for the reason that the collector in its normally conducting state is a reverse biased diode with the base region. If the collector to base voltage is reversed, the collector current increases rather than vanishes. Hence, the collector current cannot be gated or keyed by means of the collector voltage.

It is, accordingly, an object of the present invention to provide an improved form of automatic gain control circuit particularly suited for application in television receiving systems.

It is another object of the present invention to provide a new and improved form of keyed automatic gain control circuit.

It is another object of the present invention to provide an improved automatic gain control circuit of the type permitting the effective employment of a semiconductor signal translating device such as, for example, the transistor.

These and other objects are effected by my invention as will be apparent from the following description taken in accordance with the accompanying drawings, throughout which like reference characters indicate like parts, and in which.

Figure 1:
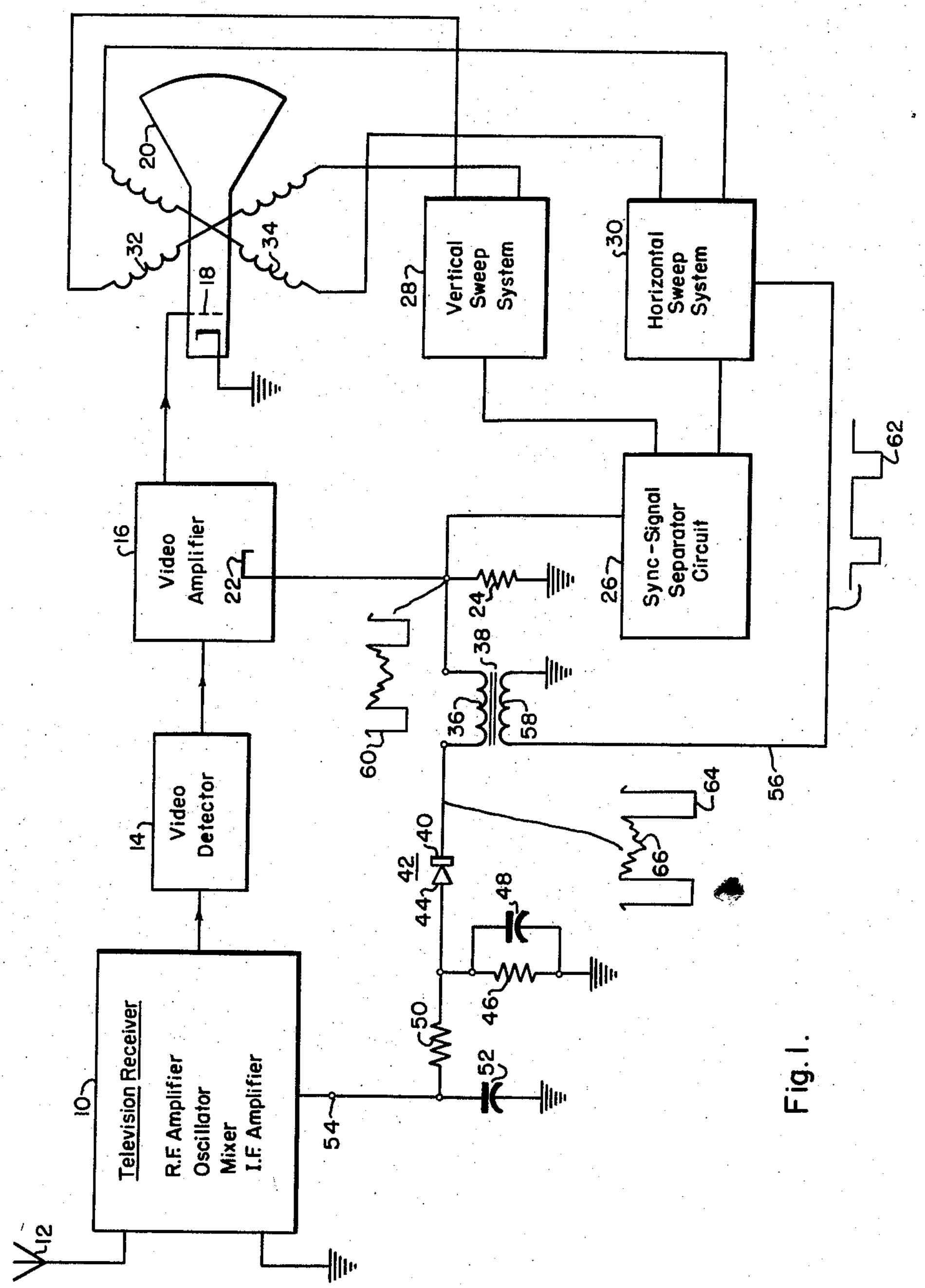
Figure 1 shows a television receiver including one embodiment of the invention.

Referring to Fig. 1 in detail, there is represented in block form at 10, the typical components of a conventional television receiver comprising an R.F. amplifier, an oscillator, a mixer, and an I.F. amplifier, all constructed and connected together in well-known fashion. An input radio frequency signal to the R.F. amplifier is conventionally provided by an antenna 12. The output of the I.F. amplifier is coupled to a video detector 1 which includes a suitable detecting device. The video signal as demodulated from the radio frequency carrier is then applied to a video amplifier 16, the output of which is supplied to the control electrode 18 of cathode ray image reproducing device 20.

The video amplifier 16 includes a normally non-conductive electron discharge device having a cathode 22 which is connected to ground potential through a resistor 24. The cathode 22 is also connected to a synchronizing-signal separator circuit 26. The separator circuit 26 is, in turn, connected to a vertical-sweep system 28 and to a horizontal-sweep system 30. The outputs of the vertical-sweep system 28 are connected to vertical-deflecting elements 32 of the device 20, and the outputs of the horizontal-sweep system 30 are connected to horizontal-deflecting elements 34 of the device.

The cathode 22 is also connected to one terminal of the secondary winding 36 of transformer 38, the other terminal of which is connected to the cathode 40 of a diode 42. The plate 44 of diode 42 is connected through a resistor 46 shunted by a condenser 48 to ground potential, and also through a filter including the resistor 50 and condenser 52 to a terminal 54 which is available on the receiver 10 for applying a unidirectional voltage for controlling the gain of the television receiver.

From an appropriate section of the horizontal-sweep system 30 a series of keying pulses or pedestals are applied by way of the lead 56 to the primary winding 58 of the transformer 38. The pulses are added to the composite video signal appearing on the secondary winding 36 and the combined signal is applied to the cathode 40 to render the diode 42 conductive only during the intervals of the keying pulses. The automatic gain control action in conjunction with the embodiment shown in Fig. 1 will now be described.

The composite video signals extending in the negative direction, as shown at 60, and which are available across the resistance 24, are added to a negative pedestal voltage, as shown at 62, obtained from the horizontal-sweep system 30. The sum of these voltages, as shown at 64, is applied to the peak detector system comprising the diode 42, the resistor 46 and the condenser 48. The peak detector system is given a short time constant to allow for control of rapid changes in signal strength. A unidirectional potential will then be developed which is independent of the picture content in the video portion of the sum voltage shown at 64, which is further filtered by resistor 50 and condenser 52 prior to application to terminal 54. If the video amplifier 16 is being used efficiently the normal output signal across resistor 24 nearly equals the maximum available output swing. Hence, any noise pulses will not exceed the synchronizing signal peaks by any appreciable amount. The height of the pedestal and the detector time constant are adjusted so that noise pulses such as shown at 66 will never cause the diode 42 to conduct.

Figure 2:
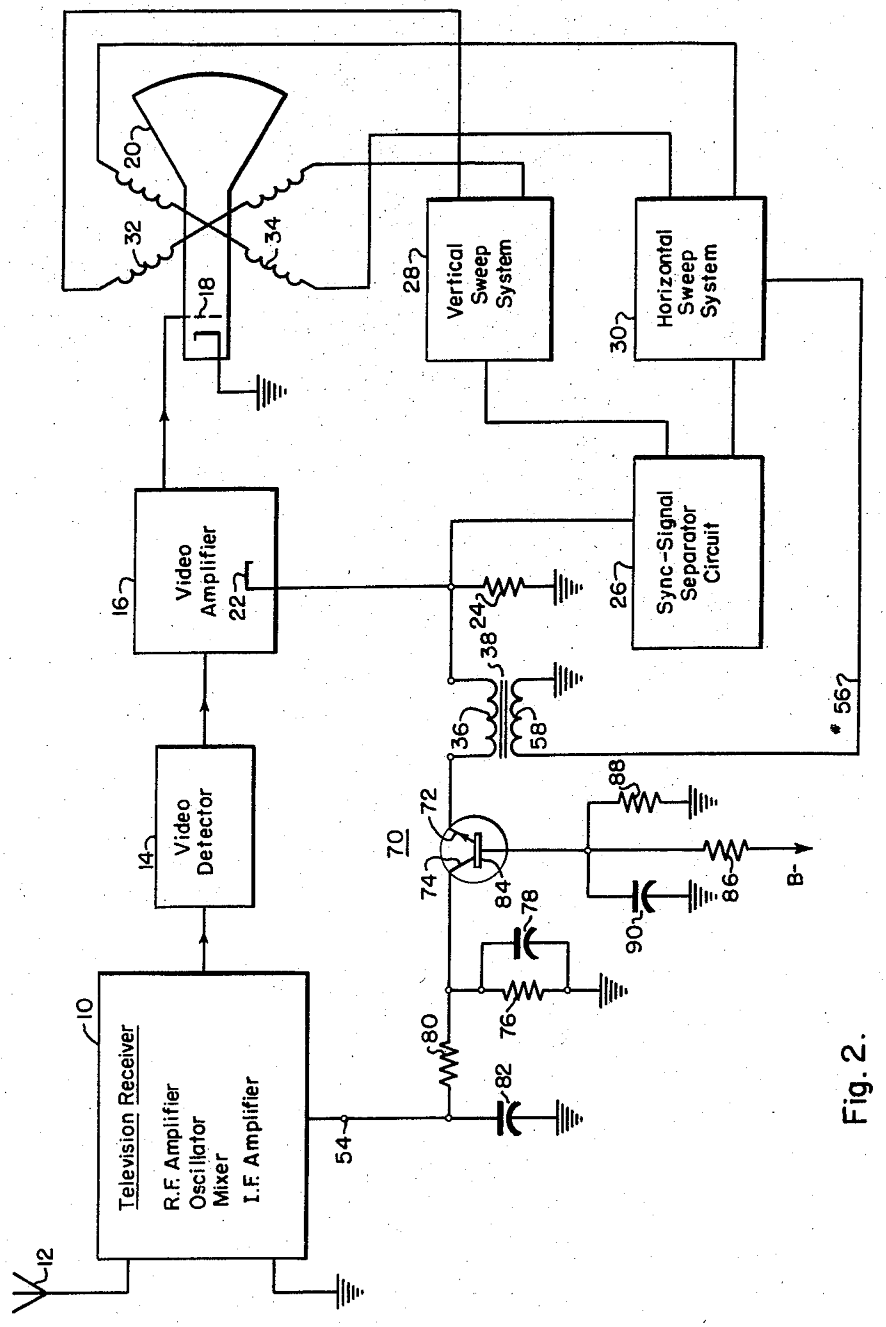
Fig. 2 shows such a receiver in which a second embodiment of the invention is incorporated.

A second embodiment of the invention is shown in Fig. 2. In the circuit of Fig. 2, a semiconductor signal translating device 70 is utilized in place of the diode 42 of Fig. 1. The semiconductor signal translating device may be typically an N-P-N junction transistor, and will be so considered in the following description of this particular embodiment of the present invention. The emitter 72 is connected to the secondary winding 36 of transformer 38. The collector 74 is connected through a resistor 76 shunted by a condenser 78 to ground potential and also through a filter including the resistor 80 and condenser 82 to terminal 54. The base 84 of the device 70 is connected through a resistor 86 to a source of B—. Connections are made from the high potential end of resistor 86 through a resistor 88 and a condenser 90, respectively, to ground potential.

The operation of the embodiment shown in Fig. 2 will now be described.

Figure 3:
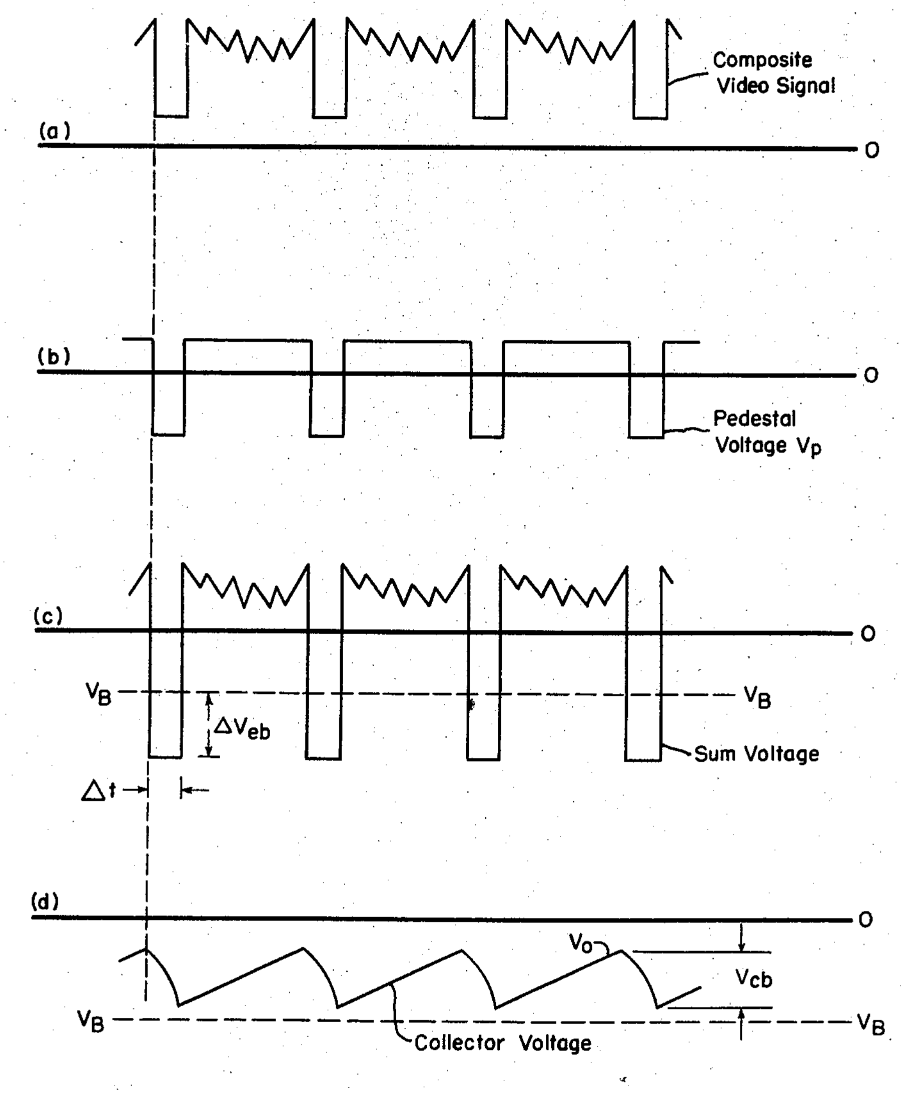
Fig. 3 shows a group of curves helpful in explaining the invention.

The composite video signals extending in the negative direction, as shown in Fig. 3(*a*) are added to the negative pedestal voltage, as shown in Fig. 3(*b*), obtained from the horizontal-sweep system 30. The sum of these voltages, as shown in Fig. 3(*c*), is applied to the emitter 72 of the signal translating device 70. The base 84 is biased below ground potential by its connection through the resistor 86 to the source of B— and through resistor 88 to ground. The device 70 will not conduct unless the negative peaks of the "sum" voltage drop the potential of the emitter 72 below the base bias voltage $V_B$. The height of the pedestal voltage $V_p$ and the base bias voltage are adjusted so that conduction in the device 70 is delayed until the video signal reaches the desired level, then pulses of current from the collector 74 charge the condenser 78 developing a negative automatic gain control voltage. The resistor 76 provides for discharging the condenser 78 quickly enough to allow for rapid changes in strength of the video signal. The value of the base bias voltage $V_B$ controls the delay in applying the automatic gain control voltage, the more negative, the greater the delay. The negative automatic gain control voltage developed is further filtered by resistor 80 and condenser 82 prior to application to the terminal 54.

The embodiment of Fig. 2 provides voltage gain as compared to the embodiment of Fig. 1. Assuming that the effective source impedance $R_g$, of the "sum" voltage is greater than the input impedance of the device 70, then if the "sum" voltage drops below the base bias level $V_b$ by $\Delta V_{eb}$ for a period $\Delta t$ (5 to 10 microseconds), the current in the emitter 72 and collector 74 is $\Delta V_{eb}/R_g$, and the corresponding change in collector potential is $$\Delta V_{cb}=(\Delta V_{eb})(\Delta t/R_g C)$$

assuming also that the collector 74 does not "bottom," that is, $V_{cb}$ reach zero before the end of the charge period of condenser 78. Resistor 76 is adjusted so that the collector 74 returns to the potential $V_0$ (Fig. 3(*d*)) which it had just prior to the charge of condenser 78. The gain of the circuit of Fig. 2 is $$\frac{\Delta V_{cb}}{\Delta V_{eb}}=\frac{\Delta t}{R_g C}$$

Where, for example, $R_g$=500 ohms, $C$ (condenser 78) = 2000 micromicrofarads, and $\Delta t$=5 microseconds, the gain is equal to 5. This is the case where the device 70 operates in its linear region, that is, the collector 74 remains greater than the base bias voltage $V_B$ in the case of an N-P-N transistor.

While certain specific embodiments of the invention have been shown and described, it will be obvious to those skilled in the art that it is not so limited, but is susceptible of various changes and modifications thereof without departing from the spirit and scope thereof. For example, the embodiments of Figs. 1 and 2 may be modified to provide different polarities for the video signal and pedestal pulses or keying signals and different senses of automatic gain control voltage.

I claim as my invention:

1. In a television receiver adapted to receive and demodulate a composite television signal including a periodically recurrent synchronizing component representing a substantially constant peak percentage of radio carrier modulation, an automatic gain control system comprising in combination, a normally nonconductive semiconductor signal translating device having electrodes corresponding to a base, emitter and collector, a source of demodulated composite signal, a source of keying pulses synchroniously related to said recurrent synchronizing component, with the keying signals having the same polarity as said recurrent synchronizing component, means for applying the demodulated composite signal and the keying signals to the emitter electrode of said device to render said device conductive, a load circuit for said translating device connected between said collector electrode and a point of reference potential for developing a unidirectional potential in said load circuit in accordance with the peak amplitude of the demodulated composite signal and the keying signals applied to the emitter electrode of said device, means connected with said load circuit for controlling the gain of said receiver in accordance with the control potential developed in said load circuit, and biasing connected between said base electrode and said point of reference potential for maintaining said device normally non-conductive.

2. In a television receiver adapted to receive and demodulate a composite television signal including a periodically recurrent synchronizing component representing a substantially constant peak percentage of radio carrier modulation, an automatic gain control system comprising in combination, a normally non-conductive semiconductor signal translating device having electrodes corresponding to a base, emitter and collector, a source of demodulated composite signal, a source of keying pulses synchronously related to said recurrent synchronizing component, with the keying signals having the same polarity as said recurrent synchronizing component, means for applying the demodulating composite signal and the keying signals to the emitter electrode of said device to render said device conductive only during the intervals of said keying signals, a load circuit for said translating device connected between said collector electrode and a point of reference potential and comprising a resistance and a capacitance having a short time constant for developing a unidirectional potential in accordance with the peak amplitude of the demodulated composite signal and the keying signals applied to the emitter electrode of said device, and means connected with said load circuit for controlling the gain of said receiver in accordance with the control potential developed in said load circuit, and biasing connected between said base electrode and said point of reference potential for maintaining said device normally non-conductive.

3. In a television receiver adapted to receive and demodulate a composite television signal including a periodically recurrent synchronizing component representing a substantially constant peak percentage of radio carrier modulation, an automatic gain control system comprising in combination, a semiconductor signal translating device having electrodes corresponding to a base, emitter and collector, a source of demodulated composite signal, a source of keying pulses synchronously related to said recurrent synchronizing component, with the keying signals having the same polarity as said synchronizing components, means connected to said source of demodulated composite signal and to said source of keying pulses for developing a combined control potential, means for applying said control potential to the emitter electrode of said device, a source of bias potential associated with said base electrode for biasing said device to collector-current cut-off except when said control potential exceeds the magnitude of said bias potential, a load circuit for said translating device connected between said collector electrode and a point of reference potential for developing a unidirectional control potential with respect to said point of reference potential, and means connected with said load circuit for controlling the gain of said receiver in accordance with the control potential developed in said load circuit.

References Cited in the file of this patent

UNITED STATES PATENTS

| | | |
|---|---|---|
| 2,300,942 | Lewis | Nov. 3, 1942 |
| 2,307,375 | Blumlein | Jan. 5, 1943 |
| 2,566,763 | Fyler | Sept. 4, 1951 |
| 2,637,772 | Wendt | May 5, 1953 |
| 2,854,507 | Berkhout | Sept. 30, 1958 |
| 2,855,458 | Rogers | Oct. 7, 1958 |